United States Patent [19]

Yoshida et al.

[11] Patent Number: 5,328,770

[45] Date of Patent: Jul. 12, 1994

[54] POLYESTER COMPOSITION, PROCESS FOR PREPARING SAME, AND FILM FORMED USING SAME

[75] Inventors: Minoru Yoshida, Mishima; Masaru Suzuki, Ito; Masahiro Kimura, Ohtsu; Toshihiro Sasaki, Susono, all of Japan

[73] Assignee: Toray Industries, Inc., Japan

[21] Appl. No.: 58,966

[22] Filed: May 5, 1993

Related U.S. Application Data

[62] Division of Ser. No. 918,375, Jul. 23, 1992, abandoned.

[51] Int. Cl.$^5$ ............................................. B32B 27/36
[52] U.S. Cl. .................................... 428/480; 528/272;
528/275; 528/285; 528/302; 528/308;
528/308.6; 525/437; 525/445; 524/174;
524/401; 524/408; 524/414; 524/502; 524/505;
428/327; 264/210.7
[58] Field of Search ............... 528/272, 275, 285, 302,
528/308, 308.6; 525/437, 445; 524/174, 401,
408, 414, 502, 505; 428/327, 480; 264/210.1

[56] References Cited

U.S. PATENT DOCUMENTS

| 5,084,340 | 1/1992 | Light | 428/327 |
| 5,126,195 | 6/1992 | Light | 428/327 |

FOREIGN PATENT DOCUMENTS

2189359  7/1990  Japan.

*Primary Examiner*—Samuel A. Acquah
*Attorney, Agent, or Firm*—Austin H. Miller

[57] ABSTRACT

According to the present invention there is provided a polyester composition comprising an aromatic polyester having copolymerized therein a compound containing at least one sulfonic acid group or sulfonic acid metal salt group, and crosslinked polymer particles, preferably crosslinked polymer particles coated with a water-soluble polymer. The particles are incorporated in a slurried state into the polymer. There is also provided a laminate film containing the polymer with the particles thus incorporated therein.

The polyester composition is superior in uniform dispersibility of the particles, re-agglomeratin does not occur in melt-storage for a long time, and films formed using the polyester composition are superior in traveling performance and abrasion resistance.

18 Claims, No Drawings

POLYESTER COMPOSITION, PROCESS FOR PREPARING SAME, AND FILM FORMED USING SAME

This application is a division of application Ser. No. 07/918,375 filed Jul. 23, 1992 now abandoned.

FIELD OF THE INVENTION

The present invention relates to a polyester composition wherein crosslinked polymer particles maintain a uniform monodisperse state even when held in a melted state for a long time, as well as a process for preparing the same, and film formed using the same.

BACKGROUND OF THE INVENTION

Polyesters, particularly polyethylene terephthalate, are widely used as fibers, films and other shaped articles because of having superior physical and chemical properties. However, contrary to such superior properties it is also known that there occur undesirable troubles such as the deterioration of tile working efficiency and of the product value because of poor process passing property in a film or other shaped article-forming process for obtaining the aforementioned shaped articles and poor slipperiness in the handling of products.

In connection with such problems, there have been proposed many methods for improving the surface slipperiness of products by incorporating fine particles in polyesters to impart moderate concave and convex shapes to the surfaces of the shaped articles, and some of the methods have been adopted practically. For example, there is known a method (e.g. Japanese Patent Laid Open Nos. JP55-133431A and JP57-125247A) wherein inert inorganic particles such as the particles of silicon oxide, titanium dioxide, calcium carbonate, talc or kaolinite, or fine particles of organic polymers such as benzoguanamine-formaldehyde resin, polytetr; afluoroethylene-hexafluoropropylene copolymer or polyphenyl ester resin, are added to a polyester preparing reaction system.

However, in the method of adding inert inorganic particles, the affinity for polyester is generally poor, so when formed into a film for example, voids are formed in the vicinity of the particles. Besides, coarse particles are often mixed into the polyester, and even if pulverizing or classifying operations are performed for removing such coarse particles, the incorporation of the coarse particles is unavoidable. If such voids are formed or coarse particles are present, then in the case of films for which transparency is required, such as, for example, films for printing plates and microfilm, the transparency will be markedly deteriorated, and in the case of films for capacitors, a bad influence will be exerted on electrical properties. Further, in the case of a film for magnetic tapes, electro-magnetic conversion properties will be deteriorated, or drop-out will occur, thus resulting in impairment of the film quality.

On the other hand, according to the method of adding fine particles of an organic polymer, the affinity for polyester is generally good, but it is difficult to obtain uniform and fine particles, and even if such fine particles are obtained, their dispersibility in the polyester is poor. For example, the particles will agglomerate in the polyester. Thus, incorporation of coarse particles is unavoidable.

Recently, with respect to films for which transparency is required, films for capacitors and films for magnetic tapes, a higher quality has been required, and a film superior in slipperiness, having a uniform surface and containing particles superior in the affinity for polyester has been desired.

It is an object of the present invention to eliminate the above-mentioned disadvantages of the conventional particles adding methods.

More particularly, the objects of the present invention are to provide a polyester composition wherein crosslinked polymer particles maintain a uniform monodisperse state even when held in a melted state for a long time, said polyester having specific functional groups, to provide a process for preparing the same and to provide a polyester film superor in all of slipperiness, surface unifomity, transparency and abrasion resistance.

SUMMARY OF THE INVENTION

In a first aspect of the present invention there is provided a polyester composition comprising (A) an aromatic polyester having been copolymerized therein a compound containing least one sulfonic acid group or sulfonic acid metal salt group and (B) crosslinked polymer particles.

In a second aspect of the present invention there is provided a process for preparing a polyester composition characterized in that a slurry of crosslinked polymer particles (B) in water or in an organic compound having a boiling point less than 200° C. is added to an aromatic polyester (A) copolymerized at least one sulfonic acid group or sulfonic acid metal salt group, or a synthesis reaction system of the aromatic polyester (A).

According to the present invention, by combining a polyester having a specific functional group with crosslinked polymer particles, crosslinked polymer particles can be uniformly monodispersed in the polyester and can maintain this state even when held in a melted state for a long time and there can be obtained a polyester film having superior slipperiness, surface uniformity, transparency and abrasion resistance which have been unattainable in the prior art.

Thus, in a third aspect of the present invention there is provided a film formed using the polyester composition.

DESCRIPTION OF THE PREFERRED EMBODIMENTS

The present invention will be described in more detail hereinunder.

In the present invention, the aromatic polyester (A) having been copolymerized therein a compound containing at least one sulfonic acid group or sulfonic acid metal salt group indicates a polyester containing as main monomer components (a) an aromatic dicarboxylic acid or an ester-forming derivative thereof, (b) a glycol and (c) a compound having at least one sulfonic acid group or sulfonic acid metal salt group.

As examples of the aromatic dicarboxylic acid (a) there are mentioned terephthalic acid, 2,6-naphthalenedicarboxylic acid and 1,2-bis (chlorophenoxy) ethane-4, 4'-dicarboxylic acid, and as examples of the ester-forming derivative thereof (a) there are mentioned dimethyl terephthalate, dimethyl-2,6- naphthalenedicarboxylate and demethyl-1,2-bis (chlorophenoxy) ethane-4, 4'-dicarboxylate, with terephthallc acid, 2,6-naphthalenedicarboxylic acid, dimethyl terephthalate and dimethyl-2,6-naphthalenedicarboxylate being preferred.

Examples of the glycol component (b) include ethylene glycol, butylene glycol, diethylene glycol, propylene glycol, polyethylene glycol and 1,4-cyclohexanedimethanol, with ethylene glycol being particularly preferred.

As the compound (c) having at least one sulfonic acid group or sulfonic acid metal salt group, a polyester-forming monomer, especially an aromatic dicarboxylic acid or an ester-forming derivative thereof, having one or two sulfonic acid groups or sulfonic acid metal bases, is preferred. Examples are 5-sodium sulfoisophthalic acid and ester-forming derivatives thereof, 5-lithium sulfoisophthalic acid and ester-forming derivatives thereof, and 5-sodium sulforesorcin. Particularly, 5-sodium sulfoisophthalic acid and ester-forming derivatives thereof, 5-lithium sulfoisophthalic acid and ester-forming derivatives thereof are preferred.

As to the amount of the compound (c) to be copolymerized, 0.1-10 parts by weight is preferred, based on 100 parts by weight of tile total carboxylic acid components constituting the aromatic polyester (A) in view of the dispersion stability of the crosslinked polymer particles while being held in a melted state. Further, in point of handling of a film formed using the resulting composition and the dispersion stability of particles, the amount of the component (c) to be copolymerized is preferably 0.1-8 parts by weight, more preferably 0.1-6 parts by weight, most preferably 0.1-2 parts by weight, based on 100 parts by weight of the total carboxylic acid components constituting the aromatic polyester (A).

Other components than the above components (a), (b) and (c) may also participate in the copolymerization. Examples are diols such as neopentyl glycol, polyalkylene glycol and p-xylylene glycol; dicarboxylic acids such as adipic, sebacic, phthalic and isophthalic acids; polyfunctional carboxylic acids such as trimellitic acid and pyromellitic acid; and hydroxycarboxylic acids such as p-hydroxyethoxybenzoic acid.

In the case where the dicarboxylic acid component is a dicarboxylic acid, it is subjected to an esterification reaction with glycol, while in the case of it being a dicarboxylic acid ester, it is subjected to an ester interchange reaction with glycol, then both cases are followed by polycondensation at a high temperature under a reduced pressure to obtain polyesters.

It is also possible to perform the polycondensation using a prepolymer itself as a starting material.

As the crosslinked polymer particles used in the present invention there may be used a copolymer of a monovinyl compound (P) having only one aliphatic unsaturated bond in the molecule with a compound (Q) having two or more aliphatic unsaturated bonds in the molecule as a crosslinking agent, or only the later, crosslinking agent, (Q). But no limitaion is made thereto.

As examples of the compound (P) there are mentioned aromatic monovinyl compounds such as styrene, α-methylstyrene, fluorostyrene, vinyl pyridine and ethylvinylbenzene; vinyl cyanide compounds such as acrylonitrile and methacrylonitrile; acrylic ester monomers such as butyl acrylate, 2-ethylhexyl acrylate, methyl acrylate, 2-hydroxyethyl acrylate, glycidyl acrylate and N,N'-dimethylaminoethyl acrylate; methacrylic ester monomers such as butyl methacrylate, 2-ethylhexyl methacrylate, methyl methacrylate, 2-hydroxyethyl methacrylate, glycidyl methacrylate, N,N'-dimethylaminoethyl methacrylate; mono- or dicarboxylic acids such as acrylic, methacrylic, maleic and itaconic acids, as well as dicarboxylic acid anhydrides; and amide monomers such as acrylamide and methacrylamlde.

As examples of the compound (Q) there are mentioned divinylbenzene compounds and polyvalent acrylates and methacrylates such as trimethylolpropane triacrylate, trimethylolpropane trimethacrylate, polyethylene glycol diacrylate, polyethylene glycol dimethacrylate, 1,3-butylene glycol diacrylate, 1,3-butylene glycol dimethacrylate, trimethylolpropane triacrylate and trimethylolpropane trimethacrylate. When controlling the particle size is considered, it is desirable to use divinylbenzene, ethylene glycol demethacrylate or trimethylolpropane trimethacrylate as the compound (Q).

The compounds (P) and (Q) exemplified above may be used each in combination of two or more.

Preferred examples of the crosslinked polymer particles used in the present invention are crosslinked polymer particles of divinylbenzene polymer, divinylbenzene copolymer (ethylvinylbenzene-devinylbenzene), butyl acrylate-divinylbenzene copolymer, 2-ethylhexyl acrylate-divinylbenzene copolymer and 2-ethylhexyl acrylate-ethylene glycol dimethacrylate copolymer. The particles may be produced using a three- or more multi-component system such as, for example, butyl acrylate-ethylvinylbenzene-divinylbenzene copolymer, styrene-ethylvinylbenzene-divinylbenzene copolymer, or 2- ethylhexyl acrylate-ethylene glycol dimethacrylate-divinylbenzene copolymer.

As to the heat resistance of the crosslinked polymer particles used in the present invention, it is preferable for the particles to have a heat resistance of 350° C. or higher, more preferably 360° C. or higher, particularly preferably 370° C. or higher, in terms of a thermal decomposition temperature (10% weight loss temp.) as measured using a thermobalance. If the thermal decomposition temperature is lower than 350° C., the particles will agglomerate during preparation of the polyester compostion, during melt-molding, or at the time of recovery and re-use of a molded product made of the polyester composition, resulting in impairment of the surface uniformity and abrasion resistance of the molded product. In order for the particles to have the above-mentioned heat resistance, it is necessary that crosslinking is effected to a high degree by the compound (Q) as a crosslinking agent. Although the kind of the crosslinking agent to be used is not specially limited, divinylbenzene is preferred and the proportion thereof as a pure divinylbenzene relative to monomer is preferably higher than 5 wt%, more preferably higher than 8 wt%.

In the crosslinked polymer particles used in the present invention there may be incorporated an additional component other than the compounds (P) and (Q). An example is diethylbenzene as an impurity of divinylbenzene which is available commercially.

In the present invention, an average particle diameter of the crosslinked polymer particles dispersed in the polyester is preferably in the range of 0.01 to 5 μm, more preferably 0.05 to 2 μm, in point of slipperiness, transparency and abrasion resistance.

In point of superior slipperiness, surface uniformity and abrasion resistance it is desirable that the crosslinked polymer particles are spherical in shape and have a uniform particle size distribution. More specifically, the particles preferably have a volume shape factor, of 0.35 to $$\frac{\pi}{6},$$

more preferably 0.45 or more. The volume shape factor, f, is expressed as f=V/D³ where V represents the volume of the particles (μm³) and D represents a maximum diameter (μm) in a projection plane of the particles the above, V and D are determined in the following manner. From a biaxially oriented film, one of the formed products comprising the polyester composition of the present invention, ultrathin specimens having a thickness of about 0.3 μm are prepared by using an ultrathin film-preparing apparatus with regard to the cross sections in the MD and TD directions. As to the specimans, the number average particle diameters (a, b and c) are measured with regard to the MD, TD and thickness directions by using a transmission electron microscope. The volume of the particles (V) and the maximum diameter in a projection plane of the paricles (D) are calculated from tile following equations:

$$V = \frac{4}{3} \pi \cdot a \cdot b \cdot c$$
$$D = \max(a, b, c)$$

The crosslinked polymer particles of the present invention preferably have a weight average diameter (Dw) to number average diameter (Dn) ratio (Dw/Dn) of higher than 1.1 in point of slurry preservation stability and film abrasion resistance. Those composed of relatively uniform large particles and small particles are more preferable than those composed of particles having irregularly different various diameters. Such a mixed state may be confirmed by taking particles out of a particles-containing slurry or a polyester solution, diluting the particles with pure water or the like and measuring the number-based particle distribution by using a apparatus by dynamic light scattering method and so forth. By the method mentioned above the presence of a particle group having diameters with in some range and another particle group having diameters within some range different from the above range can be observed. More preferably, the number-based particle distribution has at least one peak in the range of 0.001–0.2 μm ($S_1$) and at least one peak in the range of 0.2–5 μm ($S_2$) and the ratio of the number at the highest peak in the range $S_1$ to that at the highest peak in the range $S_2$ is preferably 1/1,000–1,000, and more preferably 1/100–100. It is preferred that the range $S_2$ has two or more peaks in point of film flatness and rolled film figure. In order to obtain such a particle size distribution, crosslinked polymer particles having some diameters with sharp particle diameter distribution and crosslinked polymer particles having diameters different from above with sharp particle diameter distribution may be blended.

As the crosslinked polymer paricles used in the invention there may be used those obtained by a known method. The following are mentioned as examples of such known method:

(1) A soap-free polymerization method wherein polymerization is performed without using an emulsifying agent, or using an extremely small amount of an emulsifying agent.

(2) A seed polymerization method wherein polymer particles are added into a polymerization system prior to emulsion polymerization.

(3) A core-shell polymerization method wherein monomer components are partially emulsion-polymerized and in this polymerization system tile remaining monomer portion is polymerized.

(4) A polymerization method using Ugelstad which is disclosed in Japanese Patent Laid Open Nos. JP54-97582A and 54-126288A.

(5) A polymerization method corresponding to the method (4), but not using a swelling assistant.

Particularly, the above methods (3) and (4) are preferred because it is possible to obtain spherical crosslinked polymer particles having a uniform particle size distribution.

In the present invention, the crosslinked polymer particles may have functional groups. The kind of such functional group is not specially limited. Examples are carboxyl group, hydroxyl group, sulfonic acid group, ester group, and metal salts of carboxyl group.

Although no special limitaion is placed on how to introduce the functional group, it is desirable from the standpoint of heat resistance of the particles that particles as a matrix of high crosslinking be once produced and then the functional group be introduced into the surfaces of the matrix particles. For example, in the case of introducing a sodium salt of carboxyl group, there are prepared particles which are highly crosslinked by divinylbenzene, using the particles of a styrene-divinylbenzene copolymer as matrix particles. Thereafter carboxyl group are introduced into the particle surfaces using methacrylic acid. By rendering the interior of the particle preparation system alkaline, a functional group of —COONa is introduced into the particle surfaces. The amount of the compound having a functional group to be introduced into the particle surface is usually 0.01–500 parts by weight, preferably 0.1–300 parts by weight based on 100 parts by weight of the matrix particles.

The amount of the crosslinked polymer particles to be added relative to the aromatic polyester is preferably in the range of 0.0001 to 20 wt%, more preferably 0.001 to 10 wt%, still more preferably 0.01 to 5 wt%.

Although the surface state of the crosslinked polymer particles is not specially limited, if there are used crosslinked polymer particles whose surfaces are partially or wholly coated with a water-soluble high molecular compound, the dispersibility of the particles will be improved and there will be obtained an outstanding effect.

The water-soluble polymer just referred to above is not specially limited if only it is soluble in water, but those dissolving at least 0.1 wt% in water at 25° C. are preferred.

Even in tile case where the solubility speed is extremely slow, if an aqueous solution of at least 0.1 wt% of a polymer is obtained by once dissolving the polymer in heated water followed by cooling to 25° C., such a polymer may also be used. Examples are synthetic polymers such as polyvinyl pyrrolidone, polyvinyl alcohol, polyethylene oxide, polyacrylic acid, polyacrylic ester, polyacrylic acid partial metal salt or partial ammonium salt, polymethacrylic acid, polymethacrylic ester and polyester, semisynthetic polymers such as partially allylated cellulose and carboxymethyl cellulose, and natural polymers such as sodium arginate and gelatin. These may be homopolymers or copolymers. Polymers having vinylpyrrolidone units are most preferable. It is desirable to use such a water-soluble polymer to improve the dispersion stability when added to an aqueous slurry of the crosslinked polymer particles, particularly a water-soluble polymer such, polyvinylpyrrolidone for example whose addition results in an increase in an absolute value of zeta-potential at a pH range of 5 to 8.

As to the molecular weight of the water-soluble polymer, the range of 300 to 1,000,000 is preferable and the range of 1,000 to 500,000 is more preferable.

As to the amount of the water-soluble polymers to be added to the crosslinked polymer particles, 0.01–100 parts by weight to 100 parts of tile crosslinked particles are preferable, 0.1–30 parts are more preferable.

The covering percentage of a crosslinked polymer particle surface by a water-soluble polymer may be determined by observing the particle crosssection in an ultrathin specimen by means of a transmission type electron microscope and calculating the following equation.

$$\frac{\text{circumference length of crosslinking polymer particles in contact with water-soluble polymer}}{\text{circumference length of entire particles}} \times 100$$

The covering percentage is preferably higher than 10%, more preferably higher than 30% and most preferably higher than 50% in point of particle dispersion stability. In order to check the covering state precisely, preferable water-soluble polymers are those recognizable by dyeing in a polyester with osmic acid, ruthenic acid or the like.

The treatment of the crosslinked polymer particles with the water-soluble polymer is usually performed in a solvent. Considering the incorporation into the polyester it is preferable that the treatment be conducted in an aqueous system or a glycol system which is a structural unit of polyester. The treatment need not always be carried out by agitaion; for example, there may be used ultrasonic wave or a medium type mill such as a sand grinder. In this case, the water-soluble high molecular compound, may be a single compound, or plural such compounds may be used.

In the present invention, it is necessary that the crosslinked polymer particles be monodispersed uniformly in the polyester even when held in a melted state for a long time. The uniformly monodispersed state as referred to herein indicates a state wherein the particles are dispersed as primary particles in the polyester, including few secondary agglomerates. More particularly, when the polymer is observed using a transmission type electron microscope, the number of secondary agglomerate particles is preferably less then 20, more preferably less than 15, still more preferably less then 10, per field of 0.01 mm².

The crosslinked polymer particles used in the present invention can be incorporated in the polyester, for example, by a method of adding and mixing it into a polyester preparing reaction system in the form of powder or glycol slurry or by a method of kneading it with the polyester as powder or a slurry of a low boiling point solvent. According to a preferred method because of attaining more uniform monodispersion, a slurry of the crosslinked polymer particles in water and/or an organic compound having a boiling point of lower than 200° C. is added to the polyester, followed by melt-kneading. The most preferable method is a method of melt-kneading in a vent-type molding machine while degassing. The vent type molding machine is a melt-molding machine having at least one vent hole. For example, it may be an extruder or an injection molding machine. It is necessary that at least one vent hole for removing water and/or the organic compound having a boiling point of 200° C. or lower be held under reduced pressure, preferably 100 Torr lower, mope preferably 50 Torr or lower, still more preferably 30 Torr or lower.

On the other hand, it is necessary that the crosslinked polymer particles be added to the polyester or aromatic polyester (A)- preparing system as a slurry thereof in water and/or an organic compound having a boiling not higher than 200° C. As examples of the organic compound there ape mentioned alcohols such as methanol, ethanol and ethylene glycol, hydrocarbons such as benzene and toluene, as well as esters, ketones and amines. But no limitation is made thereto. Above all, water is preferred from the standpoint of handleability and removability. Of course, water and/or the organic compound may be in the form of a mixed solvent of two or more. In this case, a water-rich mixed solvent is preferred.

From the standpoint of particle dispersion, it is desirable that an anionic surfactant such as sodium dodecylbenzenesulfonate or sodium lauryl sulfate or a nonionic surfactant such as polyoxyethylene nonylphenyl ether or polyethylene glycol monostearate which are necessary for the manufacture of the particles be contained in the slurry of the crosslinked polymer particles.

Although the concentration of the slurry of the crosslinked polymer particles in water and/or an organic compound boiling not higher than 200° C. is not specially limited, it is preferably in the range of 2 to 30 wt%, more preferably 2 to 20 wt%, in view of the dispersibility of the particles in the polyester and the intrinsic viscosity of the polyester.

According to the process of the present invention, it is possible to incorporate the crosslinked polymer particles at a high concentration into the polyester. Therefore, it is also possible to first prepare a polyester containing a high concentraion of the crosslinked polymer particles and then dilute it with a polyester substantially not containing such particles before use.

In the above process, the crosslinked polymer particles are preferably mixed with tile polyester in the state of a slurry thereof in water and/or an organic compound having a boiling point of lower than 200° C. because of the following reasons. In the case where the slurry is added in the polyester preparing reaction, it is possible to avoid bad influences, e.g. marked delay of the reaction caused by water or a surfactant, and hence the working efficiency is improved. Further, even crosslinked polymer particles relatively poor in heat resistance can be incorporated into the polyester.

The aromatic polyester (A) of the present invention covers a mixture of the aromatic polyester having copolymerized at least one sulfonic group or sulfonic acid metal salt group (A) and at least one other polyester such as particle-free polyethyleneterephthalate.

In the present invention the crosslinked polymer particles are uniformly monodispersed in the polyester, so when stretched film is produced using the resulting polyester composition, there is obtained a surface having uniform concave and convex shapes.

Moreover, since re-agglomeration does not occur when the particles are held in a melted state, it is possible to maintain the uniformly monodispersion even in the film forming process. Consequently, there is obtained a film satisfying all of superior slipperiness, transparency and abrasion resistance.

The polyester used in the present invention may further contain a metallic compound catalyst such as a lithium, sodium, calcium, magnesium, manganese, zinc, antimony, germanium or titanium compound, employed usually in the manufacture of polyester, as well as a phosphorus compound as a coloration preventing agent.

The polyester composition of the present invention may further contain non-incorporated particles containing at least one of lithium and calcium and phosphorus as parts of the constituent components.

Also, the polyester composition of the present invention may contain inorganic particles having an average particle size of 0.001–5 $\mu$m. Examples of the inorganic particles are inorganic oxides such as titanium oxide, silicon oxide, zirconium oxide and aluminum oxide, inorganic carbonates such as calcium carbonate and barium carbonate, inorganic phosphates such as calcium phosphate and sodium phosphate, inorganic sulfate such as barium sulfate and calcium sulfate, inorganic mixed oxides such as kaolin and talc, fluorides, such as fluorite and other conventional inorganic particles such as potassium titanate, and aluminum hydroxide. Among them, titanium oxide, silicon oxide, calcium carbonate, zirconium oxide and aluminum oxide are most preferred. They may be substituted by any compound containing other element(s) up to 50% based on the total weight.

For preparing a composition containing both the above inorganic particles or non-incorporated particles and polymer particles there may be adopted a method wherein both are added to the polyester reaction system or the molten polyester, or a method wherein master chips obtained by blendings thereof with the polymer independently are again blended together followed by melt-kneading.

The film formed according to the present invention may be a single layer film, of course. But if a polyester composition containing the crosslinked polymer particles and a polyester containing or substantialy not containing particles are co-extruded for at least one-side lamination, followed by biaxial orientaion, there will be obtained a film having a surface superior in uniformity, slipperiness and abrasion resistance. The term lamination or laminated film means a film having two or more layers in the thickness direction.

If the film thickness of the above laminate is set at 0.1 to 10 times, particularly 0.1 to 5 times; as large as the average particle diameter of the crosslinked polymer particles added, there will be attained an improvement of slipperiness and abrasion resistance.

In point of slipperiness and abrasion resistance, it is preferable that the content of the crosslinked polymer particles in the laminate portion be in the range of 0.01 to 20 wt%, particularly 0.05 to 10 wt%.

How to prepare such biaxially oriented film will now be described concretely. Pellets of the polyester composition are mixed at a predetermined ratio, then dried, thereafter fed to a known extruder, whereby the mixture is extruded in the form of a sheet through a slit-like die, then the sheet is cooled to solidify on a casting roll to obtain an unoriented film. When a laminated film is prepared, lamination is effected using two or more extruders and a manifold or a junction block (e.g. a junction block having a square joining portion) of two or more layers, and sheet of two or more layers is extruded through the die, then cooled on the casting roll to obtain an unoriented film. In this case, it is effctive to provide a static mixer and a gear pump in the polymer flowing path. It is also effective to set the melting temperature in the extruder for the polymer on the top layer side of the laminate at a level 5° C. to 10° C. lower than that on the base layer side.

Next, the unoriented film is biaxially stretched and oriented. As the streching method there may be used a successive biaxial streching method or a simultaneous biaxial stretching method. But it is particularly preferred to use a successive biaxial stretching method wherein stretching is perfomed first in the longitudinal direction and then in the transverse direction, and divide the longitudinal stretching in three or more stages so that the total longitudinal stretch ratio is in the range of 3.5 to 6.5. The longitudinal stretching temperature differs, depending on the kind of the polyester used, but usually it is effective to set the first-stage temperature at 50° C. to 130° C. and the second and the following stage temperature at a higher level. A suitable longitudinal stretching rate is 5,000 to 50,000%/min. Commonly adopted for the transverse stretching is a method using a stenter, and a suitable stretch ratio is in the range of 3.0 to 5.0. The stretching rate and temperature in the transverse direction are suitably in the ranges of 1,000 to 20,000 %/min and 80° to 160°, respectively. The thus-oriented film is then heat-treated. A suitable heat treatment temperature is in the range of 170° to 220° C., more suitably 180° to 200° C., and a suitable heat treatment time is in the range of 0.2 to 20 seconds.

Since the polyester composition according to the present invention contains a specific polyester and crosslinked polymer particles, preferably crosslinked polymer particles treated with a water-soluble high molecular compound, the particles are uniformly monodispersed in the polyester and maintain a dispersion stability even when held in a melted state. Consequently, the following excellent effects are also exhibited.

For example, when film is to be formed from the polyester composition, there will be no clogging of the filter caused by agglomeration in the couse of melt-molding, nor will there occur breakage of the film caused by coarse agglomerated particles. In the case of a stretched film obtained from the polyester composition, there is obtained a surface having uniform concave and convex shapes. Therefore, the film is superior in slipperiness, transparency and abrasion resistance, so is suitable for magnetic tape, photograph, printing plates and capacitors.

In the case where a laminate film is formed using the composition of the present invention, the film has few coarse projections of agglomerated particles and is superior in abrasion resistance.

EXAMPLES

The following examples are given to illustrate the present invention in more detail. Characteristic values of the polyesters and the particles obtained in those examples were measured in the following manner.

(1) Particle Diameter

An average particle diameter was measured from a particle equivalent sphere diameter at a point of 50 vol%, using an electron photomicrograph of particles.

The equivalent sphere diameter represents the diameter of a sphere having the same volume as the particle volume.

Volume Shape Factor of Particles

From a biaxially oriented polyester film prepared by using a polymer composition of the present invention, ultrathin specimens having a thickness of about 0.3 μm are prepared by using an ultrathin film-preparing apparatus with regard to the cross sections in the MD and TD directions. As to the specimens, the number average particle diameters (a, b and C) are measured with regard to the MD, TD and thickness directions by using a transmission electron microscope. The volume of the particles (V) and the maximum diameter in a projection plane of the particles (D) are calculated from the following equations:

$$V = \frac{4}{3}\pi \cdot a \cdot b \cdot c$$
$$D = \max(a, b, c)$$

The volume shape factor f is calculated from the following equation:

$$f = V/D^3$$

(2) Intrinsic Viscosity of Polymer

Determined at 25° C. using o-chlorophenol as a solvent.

(3) Thermal Decomposition Temperature of Particles

A thermobalance weight-loss curve was measured at a heat-up rate of 20° C./min in a nitrogen atmosphere, using TAS-100 (a device of Rigaku Denki), and 10% decomposition was defined to be a thermal decomposition temperature.

(4) State of Particle Dispersion in Polymer

The polymers obtained were each cut into ultra-thin pieces of 0.3 μm or so by means of an ultra-thin film preparing device, then tile state of particle dispersion in the polymer was observed, and the number of secondary agglomerated particles per field of 0.01 mm² was counted.

(5) Dispersibility of Particles in Molten Polymer

The polymers obtained were each held in a nitrogen gas atmosphere at 280° C. for 10 minute when a water soluble polymer was not used or at 290° C. for 30 minutes when a water soluble polymer was used, then cooled to solidify, and analysis was made by the above method (4).

(6) Characteristics of Film

(6-1) Surface Roughness, Ra (μm)

Measured using a feeler type surface roughness tester (cut-off value: 0.08 mm, measurement length: 4 mm), according to JIS-B-0601.

(6-2) Slipperiness (μk)

Film was slit to ½ inch and was allowed to travel in an atmosphere of 20° C., 60% RH, using a tape traveling tester TBT-300 (a device of Yokohama System Kenkyu-Sho K. K.), then initial μk was determined using the following equation:

$$\mu k = 0.733 \log (T_1/T_2)$$

where $T_2$ and $T_1$ represent an incoming-side tension and an outgoing-side tension, respectively. Guide diameter is 6 mm, guide material is SUS27 (surface roughness: 0.2S), winding angle is 180° C., and traveling speed is 3.3 cm/sec.

When the μk value is not larger than 0.35, good slipperiness is obtained. The μk value of 0.35 is a critical value of whether the slipperiness will be extremely deteriorated or not during the formation of film or as product.

(6-3) Film Haze

Measured according to ASTM-D1003-52. A film haze of 0.55% or less is value which attains the objects of the present invention.

(6-4) Abrasion Resistance

Using a tape traveling tester TBT-300 (a device of Yokohame System Kenkyu-Sho K. K.), film is allowed to travel repeatedly 1,000 times in an atmosphere of 25° C., 50% RH, and then white shaving powder (white powder) deposited on the guide portion is evaluated visually.

Guide diameter is 8 mm, guide material is SUS27 (surface roughness: 0.2S), winding angle is 180° C., and tape traveling speed is 3.3 cm/sec.

The following are criteria:
- ⊚ : The amount of white powder is very small, attaining the objects.
- ○ : The amount of white powder is small, attaining the objects.
- Δ : The amount of white powder is somewhat large, not attaining the objects.
- x : The amount of white powder is very large, not attaining the objects.

In the tables which will appear later there are used the following abbreviations and amounts in connection with copolymerization, addition and treatment:

SSIA : 5-sodium dimethyl sulfoisophthalate
LSIA : 5-lithium dimethyl sulfoisophthalate
DMI : dimethyl isophthalate
DVB : divinylbenzene copolymer particles
DVB-1: commercially available divinylbenzene copolymer particles (divinylbenzene 55% ethylvinylbenzene 40%)
DVB-2: divinylbenzene copolymer particles (divinylbenzene 70%, ethylvinylbenzene 25%)
DVB-3: divinylbenzene copolymer particles (divinylbenzene 50%, ethylvinylbenzene 20%)
BA : butyl acrylate
2EHA: 2-ethylhexyl acrylate
ST : styrene
PVP : polyvinyl pyrrolidone
P(VP/MA): poly(vinyl pyrrolidone/methyl acrylate) copylymer
Copolymerization Amount: Part by weight based on parts by weight of an aromatic dicarboxylic acid or an ester-forming derivative thereof
Amount of Particles added: Part by weight based on 100 parts by weight of copolymerized polyester
Amount of particle surface treatment: Part by weight based on 100 parts by weight of crosslinked polymer particles

EXAMPLE 1

100 parts by weight of dimethyl terephthalate, 2 parts by weight of 5-sodium dimethyl sulfoisophthalate and 70 parts by weight of ethylene glycol were fed into a flask equipped with a rectification column and melted at 160° C., then 0.04 part by weight of manganese acetate was added as catalyst. Thereafter, the temperature was raised up to 240° C. over a period of 3 hours while methanol produced in the reaction was removed from the rectification column. After making sure that a predetermined amount of methanol had been distilled off, 0.03 part by weight of antimony trioxide and 0.03 part by weight of trimethyl phosphate were added and polycondensation was conducted by a conventional method to afford a copolyester having an intrinsic viscosity of 0.712.

Then, using a vent type twin-screw extruder, chips of the polymer were melted and an aqueous slurry of divinylbenzene copolymer particles (DVB-1) having an average particle diameter of 0.40 μm and Dw/Dn=1.5 was added so as to provide a final particles content in the polymer of 0.5 wt%. Melt extrusion was performed at a resin temperature of 280° C. while holding the vent hole at a vacuum degree of 10 Torr, to obtain polyethylene terephthalate (I) containing the divinylbenzene copolymer particles. The intrinsic viscosity of the polymer was 0.613.

As a result of observation of the polymer using a transmission type electron microscope, the number of secondary agglomerates per field of 0.01 mm$^2$ was 3 and the particles were present substantially in a uniformly monodispersed state.

The polymer was then held in a nitrogen gas atmosphere at 280° C. for 10 minutes, then cooled to solidify and evaluated in the same manner as above. As a result, the number of secondary agglomerates per field of 0.01 mm$^2$ was four, and it turned out that the dispersion stability of the particles was maintained even when stored in a melted state.

On the other hand, polyethylene terephthalate (II) having an intrinsic viscosity of 0.620 was prepared by a conventional method, using 100 parts by weight of dimethyl terephthalate, 70 parts by weight of ethylene glycol, 0.06 part by weight of magnesium acetate as an ester interchange reaction catalyst, 0.03 part by weight of antimony trioxide as a polymerization catalyst and 0.03 part by weight of trimethyl phosphate as a heat stabilizer.

Then, this polymer (II) and the foregoing crosslinked polymer particles-containing polymer (I) were melt co-extruded at 290° C. and the extrudate was wound around a casting drum having a surface temperature of 30° C., using an electrostatic casting method, then cooled to solidify to obtain unstretched laminate film having about 120 μm and 30 μm thick layers. This unstretched film as then stretched 3.4 times in the longitudinal direction at 90° C. and 3.6 times in the transverse direction at 100° C., with respect to the original size thereof. Subsequent heat-setting at 210° C. afforded a biaxially oriented laminate film having a thickness of 15 μm (polymer (I) 3 μm/polymer (II) 12 μm). A particles-containing surface of the film was evaluated for characteristics; as a result, slipperiness surface uniformity, transparency and abrasion resistance were all satisfactory (Table 1).

EXAMPLE 2-11

Polyethylene terephthalates (I') were prepared using a vent type extruder in the same way as in Example 1 except that the amount of 5-sodium dimethyl sulfoisophthalate to be copolymerized, and the composition, volume shape factor and average diameter of crosslinked polymer particles, the particle used together and lamination thickness were changed. The particles in the polymers were substantially in a monodispersed state, with few secondary agglomerates.

The polymers were subjected to a melt test in the same manner as in Example 1 and it turned out that the dispersion stability of the particles was maintained without any marked re-agglomeration.

Using the polymers prepared above and the foregoing polymer (II), biaxially oriented laminate films were formed in the same way as in Example 1. All of the films were superior in slipperiness, surface uniformity, transparency and abrasion resistance.

COMPARATIVE EXAMPLE 1

Using a vent type twin-screw extruder, chips of the polymer (II) were melted and an aqueous slurry (2.5 wt% based on the polymer weight) of divinylbenzene copolymer particles having an average particle diameter of 0.40 μm [obtained by the polymerization of a commercially available divnylbenzene (divinylbenzene 55%, ethylvinylbenzene 40%)] (volume shape factor 0.51) was added so as to provide a final particles content in the polymer of 0.5 wt%. Melt extrusion was performed at a resin temperature of 280° C. while holding the vent hole at a vacuum degree of 10 Torr to afford polyethylene terephthalate (III) containing the divinylbenzene copolymer particles. The intrinsic viscosity of the polymer was 0.610. As a result of observation of the polymer using a transmission type electron microscope, the number of secondary agglomerates per field of 0.01 mm$^2$ was 3 and the particles were present substantially in a uniformly monodispersed state.

The polymer was then held in a nitrogen gas atmosphere at 280° C. for 10 minutes, then cooled to solidify and evaluated in the same manner as above. As a result, the number of secondary agglomerates was twenty-four and thus it was impossible to maintain tile dispersion stability at melt.

Then, the polymer (II) and the crosslinked polymer particles-containing polymer were melt co-extruded at 290° C. and the extrudate was wound around a casting drum having a surface temperature of 30° C., using an electrostatic casting method, then cooled to solidify to obtain unstretched laminate film having about 120 μm and 30 μm thick layers. This unstretched film was then stretched 3.4 times in the longitudinal direction at 90° C. and 3.6 times in the transverse derection at 100° C. Subsequent heat-setting at 210° C. afforded a biaxially oriented laminate film having a thickness of 15 μm. A particles-containing surface of the film was evaluated for characteristics; as a result, slipperiness, surface uniformity, transparency and abrasion resistance were all not satisfactory.

COMPARATIVE EXAMPLE 2-5

Polyethylene terephthalates (III) were prepared using a vent type extruder in the same way as in Comparative Example 1 except that the crosslinked polymer particles were changed. The particles in the polymers were substantially in a monodispersed state with few secondary agglomerates.

When the polymers were subjected to a melt test in the same manner as in Comparative Example 1, there occurred re-agglomeration and the dispersion stability was not maintained.

Using the polymers (III') thus prepared and the foregoing polymer (II), biaxially oriented laminate films were formed in the same way as in Comparative Example 1. All of the films were unsatisfactory in point of slipperiness, surface uniformity, transparency and abrasion resistance.

The results obtained in Examples 1–11 and Comparative Examples 1–5 are as shown in Tables 1 and 2 below.

TABLE 1

| Example | 1 | 2 | 3 | 4 | 5 | 6 |
|---|---|---|---|---|---|---|
| Polymer and Particle characteristics | | | | | | |
| Amount of Copolymerized SSIA (parts by wt) | 2.0 | 1.0 | 1.0 | 2.0 | 3.0 | 1.0 |
| Crosslinked Polymer Particles | | | | | | |
| Kind of Particles | DVB-1 | DVB-1 | DVB/BA | DVB/BA | DVB/ST | DVB-1 |
| Average Diameter (μm) | 0.4 | 0.3 | 0.5 | 0.3 | 0.6 | 0.04 |
| Volumes Shape Factor | 0.51 | 0.51 | 0.51 | 0.51 | 0.51 | 0.51 |
| Amount (parts by wt) | 0.5 | 0.3 | 0.4 | 0.6 | 0.3 | 0.2 |
| Particle Dispersibility (pc.) | | | | | | |
| before melting | 3 | 3 | 4 | 5 | 3 | 8 |
| after melting | 4 | 3 | 3 | 5 | 4 | 17 |
| Particles used jointly | | | | | | |
| Kind of Particles | none | none | none | none | none | silicon oxide |
| Average Diameter (μm) | — | — | — | — | — | 0.5 |
| Amount (parts by wt) | — | — | — | — | — | 0.1 |
| Film characteristics | | | | | | |
| Film Thickness (μm) | 3/12 | 1.5/11.5 | 2.5/10.5 | 2.5/10.5 | 3/12 | 12 |
| Surface Roughness, Ra (μm) | 0.015 | 0.015 | 0.014 | 0.016 | 0.017 | 0.017 |
| Slipperiness, μk | 0.18 | 0.16 | 0.20 | 0.19 | 0.18 | 0.18 |
| Film Haze (%) | 0.50 | 0.50 | 0.50 | 0.51 | 0.53 | 0.51 |
| Abrasion Resistance | ○ | ⊚ | ⊚ | ⊚ | ○ | ○ |

| Example | 7 | 8 | 9 | 10 | 11 |
|---|---|---|---|---|---|
| Polymer and Particle characteristics | | | | | |
| Amount of Copolymerized SSIA (parts by wt) | 1.0 | 1.0 | 1.0 | 1.0 | 1.0 |
| Crosslinked Polymer Particles | | | | | |
| Kind of Particles | DVB/BA | DVB-1 | DVB-1 | DVB-1 | DVB-1 |
| Average Diameter (μm) | 0.6 | 0.4 | 0.4 | 0.4 | 0.4 |
| Volumes Shape Factor | 0.39 | 0.51 | 0.51 | 0.51 | 0.51 |
| Amount (parts by wt) | 0.3 | 0.2 | 0.4 | 0.5 | 0.5 |
| Particle Dispersibility (pc.) | | | | | |
| before melting | 5 | 3 | 3 | 3 | 3 |
| after melting | 6 | 4 | 4 | 4 | 4 |
| Particles used jointly | | | | | |
| Kind of Particles | none | silicon oxide | zirconium oxide | aluminum oxide | Ca-Li-p* |
| Average Diameter (μm) | — | 0.3 | 0.03 | 0.02 | — |
| Amount (parts by wt) | — | 0.2 | 0.2 | 0.2 | 0.30 |
| Film characteristics | | | | | |
| Film Thickness (μm) | 3/12 | 3/12 | 3/12 | 3/12 | 3/12 |
| Surface Roughness, Ra (μm) | 0.015 | 0.018 | 0.017 | 0.017 | 0.018 |
| Slipperiness, μk | 0.20 | 0.18 | 0.19 | 0.19 | 0.18 |
| Film Haze (%) | 0.50 | 0.53 | 0.53 | 0.54 | 0.53 |
| Abrasion Resistance | ○ | ○ | ○ | ○ | ○ |

*Ca-Li-p; non-incorporated particles containing of Ca, Li and P

TABLE 2

| Comparative Example | 1 | 2 | 3 | 4 | 5 |
|---|---|---|---|---|---|
| Polymer and Particle characteristics | | | | | |
| Amount of Copolymerized SSIA (parts by wt) | 0 | 0 | 0 | 0 | 1 |
| Crosslinked Polymer Particles | | | | | |
| Kind of Particles | DVB-1 | DVB-1 | DVB/BA | DVB/BA | ST/DVB |
| Average Diameter (μm) | 0.4 | 0.5 | 0.5 | 0.3 | 0.5 |
| Volumes Shape Factor | 0.51 | 0.51 | 0.51 | 0.51 | 0.51 |
| Amount (parts by wt) | 0.5 | 0.3 | 0.4 | 0.6 | 0.4 |
| Particle Dispersibility (peaces) | | | | | |
| before melting | 3 | 3 | 4 | 5 | 3 |
| after melting | 24 | 26 | 28 | 30 | above 50 |
| Film characteristics | | | | | |
| Film Thickness (μm) | 3/12 | 3/12 | 3/12 | 3/12 | 3/12 |
| Surface Roughness, Ra (μm) | 0.017 | 0.017 | 0.016 | 0.018 | 0.018 |
| Slipperiness, μk | 0.17 | 0.17 | 0.18 | 0.18 | 0.18 |
| Film Haze (%) | 1.30 | 2.35 | 0.75 | 0.70 | 2.50 |
| Abrasion Resistance | x | x | Δ | Δ | Δ |

EXAMPLE 12

100 parts by weight of dimethyl terephthalate, 1 part by weight of 5-sodium dimethyl sulfoisophthalate and 70 parts by weight of ethylene glycol were fed into a flask equipped with a rectification column and melted at 160° C., then 0.06 part by weight of magnesium acetate was added as catalyst. Thereafter, the temperature was raised up to 240° C. over a period of 3 hours while methanol produced in the reaction was removed from the rectification column. After making sure that a predetermined amount of such methanol had been distilled off, 0.03 part by weight of antimony trioxide and 0.03 part by weight of trimethyl phosphate were added and polycondensation was conducted by a conventional method to afford an aromatic copolyester (IV) having an intrinsic viscosity of 0.680.

10 parts by weight of divinylbenzene copolymer particles DVB-1 having an average diameter 0.3 μm, 0.1 part by weight of polyvinyl pyrrolidone (molecular weight 10,000) and 90 parts by weight of water were mixed together and then agitated by means of turbine blades at room temperature for 1 hour to afford an aqueous slurry of the divinylbenzene copolymer particles each having a surface coated with the polyvinyl pyrrolidone.

Then, using a vent type twin-screw extruder, the aromatic copolyester (IV) was melted and the aqueous slurry of divinylbenzene copolymer particles mentioned above was added in amount of 3.0 parts by weight based on 100 parts by weight of the polyester (IV). Melt extrusion was performed at a resin temperature of 280° C. while holding the vent hole at a vacuum degree of 10 Torr to afford a polyethylene terephthalate composition (V) containing the divinylbenzene copolymer particles. The intrinsic viscosity of the polymer obtained was 0.610. As a result of observation of the polymer using a transmission type electron microscope, the number of secondary agglomerates per field of 0.01 mm$^2$ was 3 and the particles were present substantially in a uniformly monodispersed state.

The polymer was then held in a nitrogen gas atmosphere at 290° C. for 30 minutes, thereafter cooled to solidify and then evaluated in the same manner as above. As a result, the number of secondary agglomerates per field of 0.01 mm$^2$ was four and it turned out that tile dispersion stability was retained even when stored in a melted state.

0.06 part by weight of magnesium acetate a catalyst was added to 100 parts by weight of dimethyl terephthalate and 64 parts by weight of ethylene glycol, and an ester interchange reaction was conducted. Then, 0.03 part by weight of antimony trioxide and 0.03 part by weight of trimethyl phosphate were added and a polycondensation reaction was performed. As a result, there was obtained a polyethylene terephthalate (VI) having an intrinsic viscosity of 0.620.

The polyethylene terephthalate composition (V) was melt co-extruded onto the polyethylene terephthalate (VI) at 290° C. to obtain unstretched laminate film. Thereafter, the film was stretched as three times as its original size in both longitudinal and transverse directions at 90° C., followed by heat-treatment at 220° C. for 15 seconds, to obtain a biaxially oriented film having an 8 μm thick layer of the polyethylene terephthalate (VI) and a 0.3 μm thick layer of the polyethylene terephthalate composition (V) laminated onto tile (VI) layer.

As a result of evaluation, this film proved to be very superior in abrasion resistance, Ra=0.014 μm, μk=0.27, as shown in Table 3.

EXAMPLE 13-18

Biaxially oriented films were produced in the same way as in example 12 except that the amount of comonomer copolymerized in the aromatic copolyester (IV), the composition, average diameter, addition amount and volume shape factor of crosslinked polymer particles in the polyethylene terephthalate composition (V), the amount and kind of surfactant, and the method for the addition of slurry were changed.

In Example 13, after the ester interchange reaction in the preparation of the aromatic copolyester (IV), a slurry of the divinylbenzene copolymer particles coated with polyvinyl pyrrolidone in water was added to obtain the polymer. In Example 16, a single layer film was obtained without using polyethylene terephthalate (VI).

Table 3 shows the results of evaluation of these films, from which it is seen that the films are very superior in both particle dispersibility after melting and abrasion resistance.

COMPARATIVE EXAMPLE 6

10 parts by weight of divinylbenzene copolymer particles DVB-]having an average diameter 0.3 μm and 90 parts by weight of water were mixed together and agitated by means of turbine blades at room temperature for 1 hour to afford an aqueous slurry of the divinylbenzene copolymer particles.

Next, the polyethylene terephthalate (VI) was melted using a vent type twin-screw extruder and the aqueous slurry of the divinylbenzene copolymer particles was added in an amount of 3.0 parts by weight based on 100 parts of the polyester (VI). Melt extrusion was performed at a resin temperature of 280° C. while holding the vent hole at a vacuum degree of 10 Torr to obtain a polyethylene terephthalate composition (VII) containing the divinylbenzene copolymer particles. The intrinsic viscosity of the polymer obtained was 0.612. As a result of observation of the polymer using a transmission type electron microscope, the number of secondary agglomerates per field of 0.01 mm$^2$ was 4 and the particles were present substantially in a uniformly monodispersed state.

The polymer was then held in a nitrogen gas atmosphere at 290° C. for 30 minutes, thereafter cooled to solidify and evaluated in the same manner as above. As a result, the number of secondary agglomerates per field of 0.01 mm$^2$ was 44 and it was impossible to maintain the dispersion stability In melt storage.

The polyethylene terephthalate composition (VII) was melt co-extruded onto the polyethylene terephthalate (VI) at 290° C. to obtain unstretched laminate film. The film was then stretched as three times as its original size in both longitudinal and transverse directions at 90° C., followed by heat treatment at 220° C. for 15 seconds to afford a biaxially oriented laminate film comprising an 8 μm thick layer of the polyethylene terephthalate (VI) and a 0.3μm thick layer of the polyethylene terephthalate composition (VII).

As a result of evaluation, this film proved to be inferior in abrasion resistance, Ra=0.016 μm, μk=0.25, as shown in Table 5.

COMPARATIVE EXAMPLES 7 AND 8

Biaxially oriented films were obtained in the same way as in Comparative Example 1 except that the amount of comonomer copolymerized in the aromatic copolyester (IV), the composition and average particle deameter of crosslinked polymer particles in the polyethylene terephthalate compositions (V) and (VII), and the amount and kind of surfactant, were changed. Table 5 shows the results of evaluation of these films, from which it is seen that the films are inferior in particle dispersibility after re-melting and also in abrasion resistance because they are outside the scope of the present invention.

The results obtained in Examples 6–12 and Comparative Examples 6–8 are as shown in Table 3 below.

TABLE 3

| Example | | Ex. 12 | Ex. 13 | Ex. 14 | Ex. 15 | Ex. 16 |
|---|---|---|---|---|---|---|
| Polyester | Comonomer | SSIA | SSIA | LSIA | SSIA | SSIA |
| | Amount of Comonomer (parts of wt) | 1.0 | 2.0 | 1.0 | 0.5 | 3.0 |
| Crosslinked Polymer Particles | Composition | DVB-1 | DVB-3/BA | DVB-1 | DVB-2 | DVB-3/2EHA |
| | Average Diameter ($\mu$m) | 0.3 | 0.5 | 0.3 | 0.4 | 0.4 |
| | Amount (parts by wt) | 3.0 | 2.5 | 5.0 | 3.0 | 2.5 |
| | Volume Shape Factor | 0.51 | 0.51 | 0.51 | 0.51 | 0.51 |
| Water-soluble Polymer | Kind | PVP | PVP | PVP | PVP | P(VB/MA) |
| | Molecular weight | 10000 | 5000 | 10000 | 100000 | 18000 |
| | Amount (parts by wt) | 1.0 | 1.0 | 0.5 | 0.5 | 2.0 |
| Particle dispersibility | before melting (pc.) | 3 | 4 | 3 | 4 | 3 |
| | after melting (pc.) | 4 | 5 | 3 | 4 | 5 |
| Film Characteristics | Surface Roughness Ra ($\mu$m) | 0.014 | 0.015 | 0.015 | 0.015 | 0.012 |
| | Film Thickness ($\mu$m) | 0.3/8.0 | 0.4/7.5 | 0.2/7.8 | 2.5/5.0 | 8.0 |
| | Slipperiness $\mu$k | 0.27 | 0.29 | 0.26 | 0.30 | 0.33 |
| | Abrasion Resistance | ⊚ | ⊚ | ⊚ | ○ | ○ |

| Example | | Ex. 17 | Ex. 18 | Con. Ex. 6 | Con. Ex. 7 | Con. Ex. 8 |
|---|---|---|---|---|---|---|
| Polyester | Comonomer | SSIA | LSIA | | | DMI |
| | Amount of Comonomer (parts of wt) | 1.0 | 1.0 | | | 2.0 |
| Crosslinked Polymer Particles | Composition | DVB-1 | DVB-1 | DVB-1 | DVB-2 | DVB-3/BA |
| | Average Diameter ($\mu$m) | 0.3 | 0.3 | 0.3 | 0.3 | 0.4 |
| | Amount (parts by wt) | 0.3 | 3.0 | 3.0 | 3.0 | 2.5 |
| | Volume Shape Factor | 0.51 | 0.51 | 0.51 | 0.51 | 0.51 |
| Water-soluble Polymer | Kind | PVP | PVP | | PVP | P(VB/MA) |
| | Molecular weight | 800 | 2000 | | 2000 | 10000 |
| | Amount (parts by wt) | 3.0 | 0.5 | | 0.5 | 1.0 |
| Particle dispersibility | before melting (pc.) | 1 | 9 | 4 | 4 | 5 |
| | after melting (pc.) | 5 | 11 | 44 | 23 | 51 |
| Film Characteristics | Surface Roughness Ra ($\mu$m) | 0.011 | 0.015 | 0.016 | 0.015 | 0.017 |
| | Film Thickness ($\mu$m) | 0.2/8.2 | 0.3/7.6 | 0.3/8.0 | 0.3/7.9 | 0.5/8.5 |
| | Slipperiness $\mu$k | 0.35 | 0.26 | 0.25 | 0.27 | 0.24 |
| | Abrasion Resistance | ○ | ○ | X | Δ | X |

What is claimed is:

1. A biaxially oriented polyester film formed by using a polyester composition comprising (A) an aromatic polyester resin having copolymerized therein, a compound containing at least one sulfonic acid group or sulfonic acid metal salt group and (B) substantially uniformly monodispersed crosslinked polymer particles, wherein the amount of the compound containing at least one sulfonic acid group or sulfonic acid metal salt group copolymerized in aromatic polyester (A) is in the range of 0.1 to 10 parts by weight based on 100 parts by weight of carboxylic acid components of said aromatic polyester.

2. A biaxially oriented polyester laminate film having as at least one layer a film formed by using a polyester composition comprising (A) an aromatic polyester resin having copolymerized therein, a compound containing at least one sulfonic acid group or sulfonic acid metal salt group and (B) substantially uniformly monodispersed crosslinked polymer particles wherein the amount of the compound containing at least one sulfonic acid group or sulfonic acid metal salt group copolymerized in aromatic polyester (A) is in the range of 0.1 to 10 parts by weight based on 100 parts by weight of carboxylic acid components of said aromatic polyester.

3. The biaxially oriented polyester film defined in claim 2, wherein the compound containing at least one sulfonic acid group or sulfonic acid metal salt group is a compound selected from the group consisting of 5-sodium sulfoisophthalic acid, ester-forming derivatives thereof, 5-lithium sulfoisophthalic acid and ester-forming derivatives thereof.

4. The biaxially oriented polyester film defined in claim 2, wherein part or the whole of the surfaces of the crosslinked polymer particles (B) are treated with a water-soluble polymer.

5. The biaxially oriented polyester film defined in claim 4, wherein the water-soluble polymer has at least vinylpyrrolidone unit as a repeating unit.

6. The biaxially oriented polyester film defined in claim 2, wherein the amount of the crosslinked polymer particles (B) is 0.0001 to 20 wt% based on the weight of the aromatic polyester (A).

7. The biaxially oriented polyester film defined in claim 2, wherein the crosslinked polymer particles (B) have an average particle diameter of 0.01 to 5 $\mu$m.

8. The biaxially oriented polyester film defined in claim 2, wherein the crosslinked polymer particles (B) has a volume shape factor of not smaller than 0.35.

9. The biaxially oriented polyester film defined in claim 2, wherein the crosslinked polymer particles (B) have a weight average diameter (Dw) to number average diameter (Dn) ratio, Dw/Dn, of not lower than 1.1

10. The biaxially oriented polyester film defined in claim 2, wherein the crosslinked polymer particles (B) are divinylbenzene copolymer particles.

11. The biaxially oriented polyester film defined in claim 2, containing precipitated particles which, as part of its constituents, contain phosphorus and at least one of lithium and calcium.

12. The biaxially oriented polyester film defined in claim 2, containing at least one kind of inorganic particle having an average particle diameter of 0.001 to 5 μm.

13. A biaxially oriented polyester laminate film having at least on one side thereof a polyester composition described in claim 1.

14. A biaxially oriented polyester laminate film as set forth in claim 2, characterized in that the film thickness of the laminate portion is 0.1 to 10 times as large as the average particle diameter of the crosslinked polymer particles (B) and that the content of said particles is in the range of 0.01 to 20 parts by weight based on 100 parts by weight of the polymer in the laminate portion.

15. A biaxially oriented polyester laminate film as set forth in claim 13, characterized in that the film thickness of the laminate portion is 0.1 to 10 times as large as the average particle diameter of the crosslinked polymer particles (B) and that the content of said particles is in the range of 0.01 to 20 parts by weight based on 100 parts by weight of the polymer in the laminate portion.

16. A polyester film as set forth in claim 1, used as a base film for a magnetic recording medium.

17. A polyester film as set forth in claim 2, used as a base film for a magnetic recording medium.

18. A polyester film as set forth in claim 13, used as a base film for a magnetic recording medium.

* * * * *

UNITED STATES PATENT AND TRADEMARK OFFICE
CERTIFICATE OF CORRECTION

PATENT NO. : 5,328,770            Page 1 of 2

DATED : July 12, 1994

INVENTOR(S) : Minoru Yoshida et al

It is certified that error appears in the above-indentified patent and that said Letters Patent is hereby corrected as shown below:

On the title page:

After "Related U.S. Application Data" "[62]" but before "[51]" insert --[30] Foreign Application Priority Data
Jul. 25, 1991 [JP] Japan.................274,501
Oct. 9, 1991 [JP] Japan.................326,282
Mar. 1, 1992 [JP] Japan................. 93,924
Mar. 2, 1992 [JP] Japan................. 93,925--

In column 1, line 38, delete "polytetr; afluoro-" and substitute --polytetrafluoro- --.

In column 2, line 65, delete "terephthallc" and substitute --terephthalic--.

In column 3, line 53, delete "later" and substitute --latter--.

In column 6, line 56, delete "tile" and substitute --the--.

In column 7, line 6, delete "an", second occurrence, and substitute --the--.

In column 8, line 7, after "Torr" insert --or--;
line 15, delete "ape" and substitute --are--.

In column 11, line 64, delete "was", second occurrence.

In column 12, line 61, after "on" insert --100--.

UNITED STATES PATENT AND TRADEMARK OFFICE
CERTIFICATE OF CORRECTION

PATENT NO. : 5,328,770

DATED : July 12, 1994

INVENTOR(S) : Minoru Yoshida et al

It is certified that error appears in the above-indentified patent and that said Letters Patent is hereby corrected as shown below:

In column 18, line 28, delete "DBV-]" and substitute --DVB-1--.
  line 55, delete "In" and substitute --in--.

Signed and Sealed this

Second Day of May, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,328,770
DATED : 7/12/94
INVENTOR(S) : Minoru Yoshida, et al

It is certified that error appears in the above-indentified patent and that said Letters Patent is hereby corrected as shown below:

In Column 10, line 52, please change "photograph" to --photographs--.

In Column 17, line 50, after "acetate", please insert --as--.

Signed and Sealed this

First Day of August, 1995

Attest:

BRUCE LEHMAN

Attesting Officer

Commissioner of Patents and Trademarks